US010127585B1

(12) United States Patent
Jones et al.

(10) Patent No.: US 10,127,585 B1
(45) Date of Patent: Nov. 13, 2018

(54) INTERACTIVE METHOD AND SYSTEM FOR ORDERING AND MARKETING WINE AND OTHER PRODUCTS

(75) Inventors: Edward J. Jones, Naples, FL (US); Edward G. Caputo, Naples, FL (US); Jack Serfass, Naples, FL (US); Nadine Serfass, Naples, FL (US); Phil Mark Turner, Naples, FL (US)

(73) Assignee: Uptown Network LLC, Naples, FL (US)

( * ) Notice: Subject to any disclaimer, the term of this patent is extended or adjusted under 35 U.S.C. 154(b) by 677 days.

(21) Appl. No.: 13/314,864

(22) Filed: Dec. 8, 2011

(51) Int. Cl.
*G06Q 30/06* (2012.01)
*G06Q 30/00* (2012.01)
*G06Q 30/02* (2012.01)

(52) U.S. Cl.
CPC ............ *G06Q 30/06* (2013.01); *G06Q 30/00* (2013.01); *G06Q 30/02* (2013.01)

(58) Field of Classification Search
CPC .... G06Q 50/12; G06Q 30/0623; G06Q 20/20; G06Q 30/0267; G06Q 30/0625; G06Q 30/0631; G06Q 10/087; G06Q 30/02; G06Q 30/0203; G06Q 30/0217; G06Q 30/0277; G06Q 30/0278; G06Q 30/0281; G06Q 30/0603; G06Q 50/01; G06Q 30/0205; G06Q 30/0236; G06Q 30/0255; G06Q 30/0269; G06F 17/30867; G06F 17/30873; G07F 17/16; H04L 12/588
See application file for complete search history.

(56) References Cited

U.S. PATENT DOCUMENTS

| | | | |
|---|---|---|---|
| 4,638,312 | A | 1/1987 | Quinn et al. |
| 4,797,818 | A | 1/1989 | Cotter |
| 5,200,909 | A | 4/1993 | Juergens |
| 6,473,739 | B1 | 10/2002 | Showghi et al. |
| 6,636,835 | B2 | 10/2003 | Ragsdale-Elliott et al. |
| 7,257,547 | B1 | 8/2007 | Terase |
| 7,359,868 | B2 | 4/2008 | Kirkpatrick |
| 7,418,413 | B1 | 8/2008 | Benson |

(Continued)

FOREIGN PATENT DOCUMENTS

| | | |
|---|---|---|
| DE | 4204876 | 8/1993 |
| WO | WO2006/082583 | 8/2006 |

OTHER PUBLICATIONS https://www.hyatt.com/hyatt/images/hotels/dfwgh/TheVirtualMenu.pdf (Year: 2009).*

*Primary Examiner* — Florian M Zeender
*Assistant Examiner* — Dana Amsdell
(74) *Attorney, Agent, or Firm* — Brian K. Johnson, Esq., LLC

(57) ABSTRACT

A method and system that uses interactive wine lists and consumer driven advertising to increase search engine rankings for restaurants and wines through social media websites. A user may automatically display an interactive wine list having a graphical interface or "skin" that is unique to a restaurant through a single mobile application by entering the restaurant information or by using geolocation to determine the restaurant at which the electronic device is located. A unique badge system promotes wines on the interactive wine list to increases wine sales from vendors. In addition, tracking allows all user actions and information entered into the interactive wine list to be used for marketing data and for bounce back marketing.

15 Claims, 11 Drawing Sheets

(56) References Cited

U.S. PATENT DOCUMENTS

| | | | |
|---|---|---|---|
| 7,454,370 B2 | 11/2008 | Baril et al. | |
| 7,831,475 B2 | 11/2010 | Baril et al. | |
| 7,945,477 B2 | 5/2011 | Werbitt | |
| 8,321,261 B2 * | 11/2012 | Gross | G06Q 30/02 705/7.32 |
| 8,626,608 B2 * | 1/2014 | Gross | G06Q 30/02 705/26.7 |
| 2002/0026364 A1 | 2/2002 | Mayer et al. | |
| 2002/0133418 A1 | 9/2002 | Hammond et al. | |
| 2002/0138350 A1 * | 9/2002 | Cogen | 705/15 |
| 2003/0088469 A1 | 5/2003 | Leifer | |
| 2003/0216970 A1 | 11/2003 | Vadjinia | |
| 2004/0143503 A1 | 7/2004 | Suthar | |
| 2005/0065851 A1 * | 3/2005 | Aronoff | G06Q 50/12 705/15 |
| 2006/0190475 A1 * | 8/2006 | Shi | G06Q 30/02 |
| 2007/0061209 A1 | 3/2007 | Jackson | |
| 2007/0144835 A1 | 6/2007 | Zhang | |
| 2008/0032719 A1 * | 2/2008 | Rosenberg | G06Q 30/02 455/466 |
| 2008/0222295 A1 * | 9/2008 | Robinson | G06F 17/30867 709/227 |
| 2008/0275761 A1 * | 11/2008 | Seifer | G06Q 10/087 705/7.34 |
| 2009/0018916 A1 * | 1/2009 | Seven | G06Q 30/02 705/14.25 |
| 2009/0144066 A1 * | 6/2009 | Van Luchene | G06Q 10/067 705/348 |
| 2009/0157486 A1 * | 6/2009 | Gross | G06Q 30/02 705/319 |
| 2009/0210321 A1 * | 8/2009 | Rapp | G06Q 10/101 705/26.1 |
| 2010/0106591 A1 | 4/2010 | Fuzell-Casey | |
| 2010/0121705 A1 * | 5/2010 | Ramer | G06Q 30/02 705/14.46 |
| 2010/0161432 A1 * | 6/2010 | Kumanov | G06Q 20/102 705/15 |
| 2012/0030042 A1 * | 2/2012 | Martucci | G06Q 10/087 705/15 |
| 2012/0226698 A1 * | 9/2012 | Silvestre | G06Q 30/02 707/741 |
| 2012/0303470 A1 * | 11/2012 | Arsenault | G06Q 10/00 705/15 |
| 2014/0040048 A1 * | 2/2014 | Hutcherson | G06Q 20/20 705/14.73 |
| 2014/0324624 A1 * | 10/2014 | Ward | H04W 4/021 705/26.7 |

* cited by examiner

INTERACTIVE METHOD AND SYSTEM FOR ORDERING AND MARKETING WINE AND OTHER PRODUCTS

BACKGROUND OF THE INVENTION

This invention relates to the sale of wine and other products, and more particularly to a method and system for using an electronic device having an interactive wine list displayed thereon to increase sales of wine within restaurants, increase repeat business at restaurants and increase sales of wines for wine vendors.

Wine lists are commonly used in restaurants to assist patrons with selecting a bottle or a glass of wine with dinner. Some restaurants also employ sommeliers to assist patrons who are not knowledgeable about wine with selecting a wine that pairs well with the type of food being ordered. However, many patrons still shy away from ordering wine in restaurants because they do not want to appear unknowledgeable in front of others. There have been attempts at introducing electronic wine lists to assist patrons with ordering wines, however such electronic wine lists are simply conventional wine lists displayed on an electronic device. Further, conventional wine lists and conventional electronic wine lists fail to promote repeat business at restaurants and potential business at vendors, such as wineries, wine stores and so forth. In addition, conventional wine lists fail to promote restaurants and vendors through the use of the Internet, social media, rewards and bounce back programs.

Therefore, a need exists for a system and method for using an interactive wine list that assists a restaurant patron with selecting a wine, promotes repeat business at the restaurant, promotes vendors and promotes consumer-driven marketing of restaurants and vendors through the use of the Internet and social media.

The relevant prior art includes the following references:

| Pat. No. | Inventor | Issue/ Publication Date |
| --- | --- | --- |
| (U.S. Pat. References) | | |
| 7,945,477 | Werbitt | May 17, 2011 |
| 7,831,475 | Baril et al. | Nov. 09, 2010 |
| 2010/0106591 | Fuzell-Casey | Apr. 29, 2010 |
| 7,454,370 | Baril et al. | Nov. 18, 2008 |
| 7,418,413 | Benson | Aug. 26, 2008 |
| 7,359,868 | Kirkpatrick | Apr. 15, 2008 |
| 7,257,547 | Terase | Aug. 14, 2007 |
| 2007/0144835 | Zhang | Jun. 28, 2007 |
| 2007/0061209 | Jackson | Mar. 15, 2007 |
| 2004/0143503 | Suthar | Jul. 22, 2004 |
| 2003/0216970 | Vadjinia | Nov. 20, 2003 |
| 6,636,835 | Ragsdale-Elliott et al. | Oct. 21, 2003 |
| 6,473,739 | Showghi et al. | Oct. 29, 2002 |
| 2003/0088469 | Leifer | May 08, 2003 |
| 2002/0138350 | Cogen | Sep. 26, 2002 |
| 2002/0133418 | Hammond et al. | Nov. 19, 2002 |
| 2002/0026364 | Mayer et al. | Feb. 28, 2002 |
| 5,200,909 | Juergens | Apr. 06, 1993 |
| 4,797,818 | Cotter | Jan. 10, 1989 |
| 4,638,312 | Quinn et al. | Jan. 20, 1987 |
| (Foreign Patent References) | | |
| WO2006/082583 | Madmon et al. | Aug. 10, 2006 |
| DE4204876 | Dieter | Aug. 19, 1993 |

SUMMARY OF THE INVENTION

A primary object of the present invention is to provide a method and system for using an interactive wine list that assists a restaurant patron with selecting a wine, promotes repeat business at the restaurant, promotes vendors and promotes consumer driven marketing of restaurants and vendors through the use of the Internet and social media.

Another object of the present invention is to transform an interactive wine list into a marketing tool for a restaurant and its vendors.

The present invention fulfills the above and other objects by providing an interactive electronic wine list that assists restaurant patrons with selecting wine, tracks wine consumption and promotes consumer-driven marketing of restaurants and vendors through the use of the Internet and social media. The system and method comprises the use of portable electronic devices, such as tablets, smart phones and so forth, to choose from various selection categories that include food pairings, price range, flavor profile, points and so forth. The electronic device may be provided by the restaurant or a patron may use his or her personal electronic device after downloading the service provider's software. The patron may also create an account with the service provider so the patron can track certain information and receive benefits. A patron may use the electronic device to narrow a selection of wine by choosing one category, such as food pairing, which may narrow the selection of wines down to merlot for example depending on the food choice. Then the patron may choose a price range category to further narrow the selection of wines based on price. If a user is not knowledgeable about wines, then the patron may select a flavor profile category to read about different wines available in the restaurant without having to ask a server or sommelier. Then, the patron may narrow the selection further by using the other selection categories, such as a point level category. The categories may be used in any order to select a wine. When the patron selects a bottle of wine, the server may be provided with a stock number or bin number so the server can quickly find the correct bottle of wine in the restaurant storage room.

The interactive wine list is created by a service provider after a restaurant creates an account with the service provider and provides the service provider with the restaurant's wine list, menu, logos, trademarks and so forth. Then, the service provider creates and provides an interactive wine list that is unique to the restaurant. The interactive wine list is stored in the service provider's database and is accessible by the restaurant through the service provider's server over the Internet. The interactive wine list may be downloaded onto electronic devices by the service provider or onto electronic devices remotely by the restaurant. The interactive wine list may be managed and updated by the restaurant logging into its account on the service provider's server.

The method and system uses consumer driven advertising to increase search engine rankings for restaurants and wines through social media websites. For the purposes of the description herein, the term "restaurant" may also include any venue that sells wine, including hotels, cruise ships, wineries, wine stores, sports arenas and so forth. After selecting a wine using the interactive wine list, a patron is prompted to enter his or her email address into the electronic device. If the patron enters his or her email address, a message will be sent to the patron after a predetermined amount of time with a special offer to return to the restaurant and a listing of the wine or wines that were ordered so the patron by the service provider has a record if he or she wants to order the wine again or buy the wine from a vendor. The information will also be saved in the service provider's database so future offers from restaurants and/or vendors may be sent to the patron.

In addition, an automated message may be sent to the patron, which the patron may automatically post to his or her personal account on a social media website, such as facebook.com or twitter.com, or to a review website, such as googlereviews.com or zagat.com. For example, a patron may receive the following message: "Just ate at XYZ Steak House and had a great filet and a bottle of XYZ cabernet." The patron may automatically post the message as is or edit the message and post it to one or more social media websites and/or review websites. These postings increase visibility of the restaurants and the vendors' products with others in the patron's social media networks who see the automated message and increase Internet search engine optimization for the restaurants and the vendors.

Patrons may also create accounts with the service provider and use their own mobile electronic device as an interactive electronic wine list. The patron may also use the account with the service provider to track what wines they have ordered and would like to purchase again and to receive coupons and rewards from the service provider, restaurants and/or vendors.

Vendors may also promote their wines to restaurants through the service provider in an auction style sale. Restaurants may receive specials on different wines from vendors in exchange for special promotions of the wines on the restaurant's interactive wine list. For example a wine purchased by a restaurant may be automatically sorted to the top of a search result list when a patron is searching for a type of wine using the interactive wine list in exchange for a lower price. The wine may also be highlighted or include a "badge" next to the listing that will indicate something unique about the wine. Badges may include a "Featured Badge," "Great Vintage Badge," "Bottle Age Badge," "Sale Badge" and so forth.

Although the method and system of the present invention is used in an interactive wine list, the steps embodied in the method and system may be applied to other industries and products. For example, an interactive product list may be created for a hair salon wherein instead of wine, hair care products are paired to customer search requests using selection categories. Customer information, selections and other sales data is collected by the service provider and used for marketing the hair salon and product vendors. In, addition, unique graphic user interfaces are created for each hair salon and are displayed on the customer's electronic device either by the customer manually entering the name and location of the hair salon or by GPS detecting the location of the electronic device at the hair salon.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
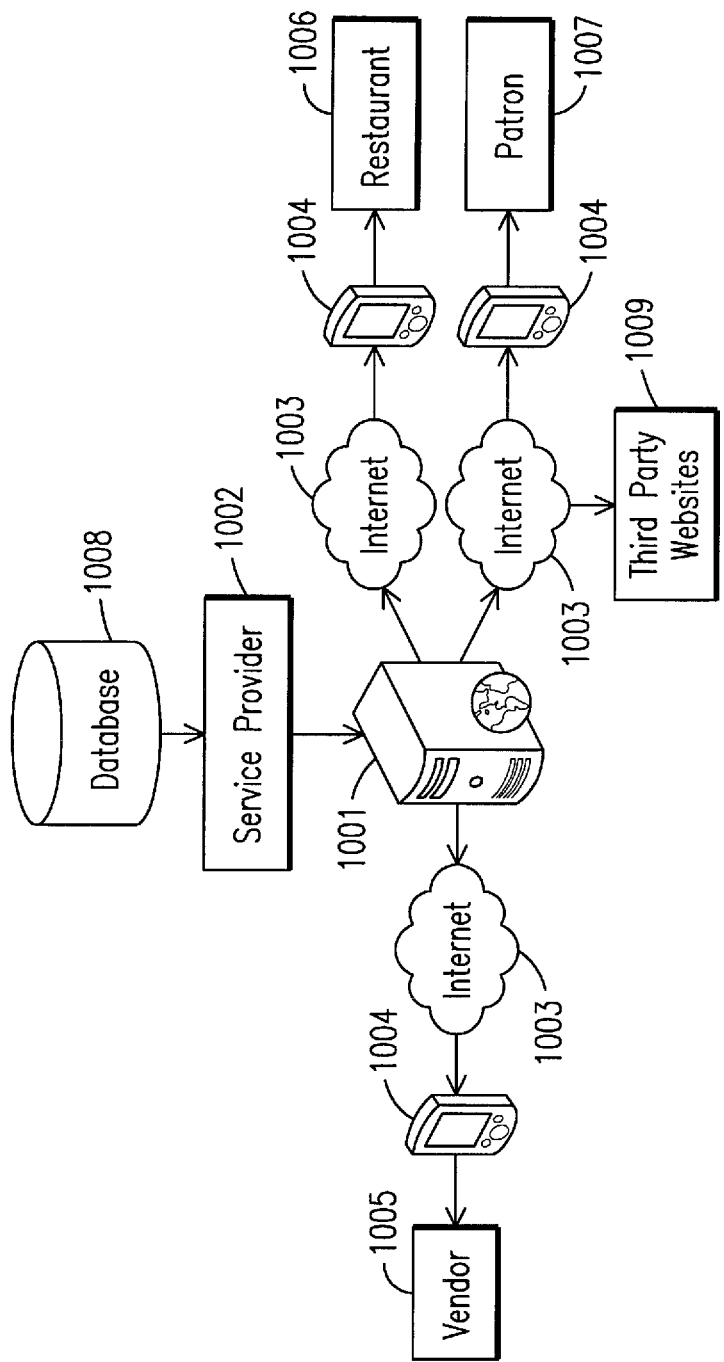
FIG. 1 is a schematic diagram of users of the present invention and a computer environment in which the method and system of the present invention operates.

With reference to FIG. 1, a block diagram of users of the present invention and a computer environment in which the method and system of the present invention operates is illustrated. A server 1001 operated by a service provider 1002 may be accessed over the internet 1003 via electronic devices 1004, such as computers, tablets, smart phones and so forth, by vendors 1005, restaurants 1006 and restaurant patrons 1007. The electronic devices 1004 used by restaurant and patrons 1007 are preferably mobile electronic devices, such as tablets, smart phones and so forth, thereby allowing the electronic devices 1004 to be used at restaurant tables by the patrons when ordering wine. The interactive electronic devices 1004 used by patrons 1007 may be provided by the restaurant 1006 or be a patron's personal electronic device 1004. Account information for vendors 1005, restaurants 1006 and restaurant patrons 1007 is stored in the service provider's database 1008. Third party websites 1009, such as social networking websites, review websites and so forth, are accessible over the internet 1003 via an electronic device 1004 being used by a restaurant patron 1007.

Figure 2:
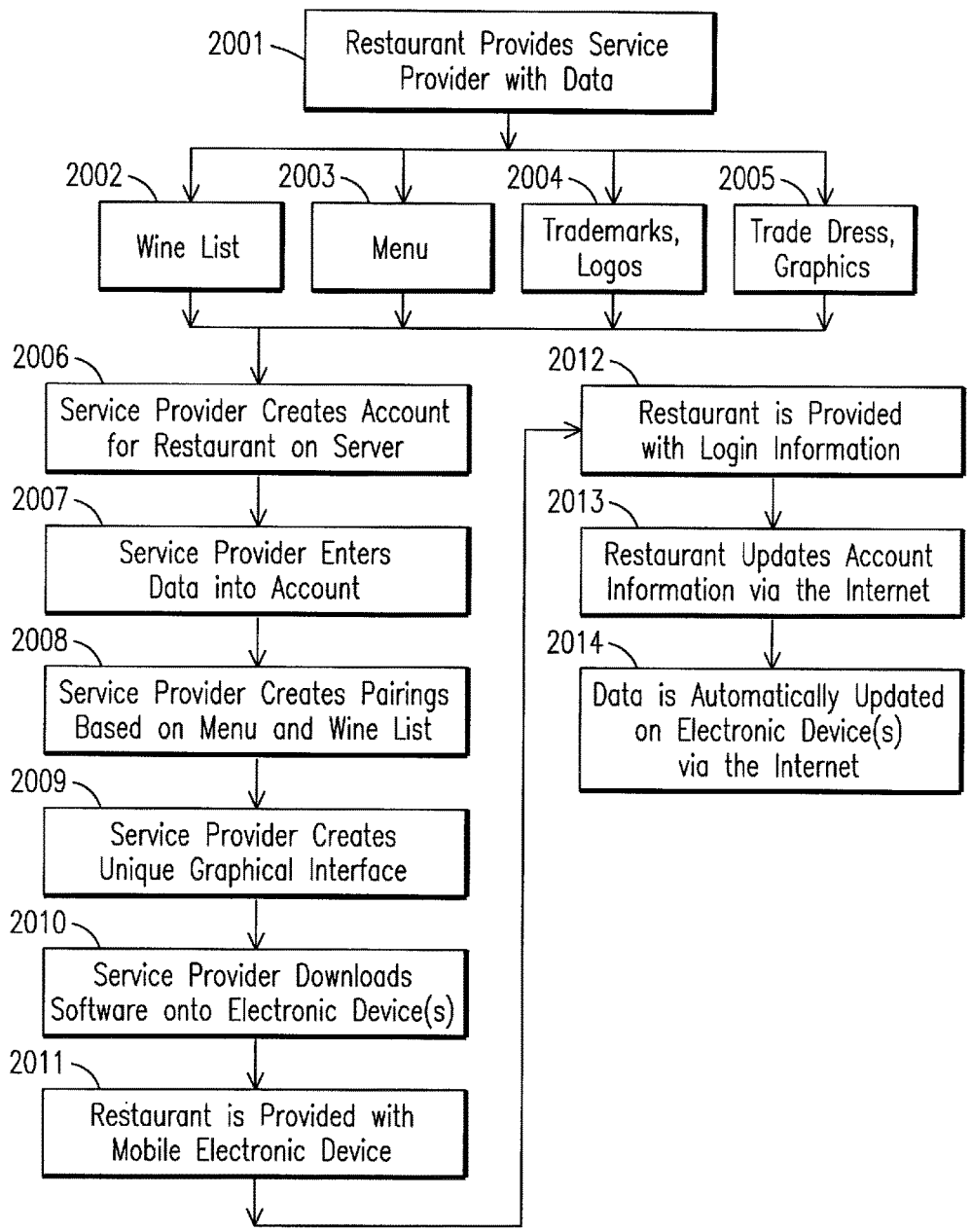
FIG. 2 is a flow chart showing steps for creating an account and interactive electronic wine list of the present invention.

With reference to FIG. 2, a flow chart showing steps for creating an account and interactive electronic wine list of the present invention is illustrated. First, a restaurant provides the service provider with data 2001, such as the restaurant's wine list 2002, menu 2003, trademarks and logos 2004, and any trade dress to be used in graphics 2005. Next, the service provider creates an account for the restaurant 2006 that is accessible by the restaurant via an electronic device using a username and password, as illustrated in FIG. 1. Then, the service provider saves the account information and data in the service provider's database 2007. The data also includes wine descriptions comprising various data points, such as wine name name, accolades, tasting notes, vintage, UPC, alcohol content, varietals, country, region, sub-region, appellation, bin #, badge, and price. The wine descriptions are saved in the service provider's database for future use in other interactive wine lists. The wine descriptions may be shared with other restaurants or only available for use by a particular restaurant. For wines where the description is available to all restaurants, everything but bin number, badge, and price is stored once in the database and shared with all restaurants. Bin number, badges, and prices are individual by restaurant in all cases and added to the description when added to a restaurant's interactive wine list. Restaurants have the ability to add a wine to the service provider's database but that wine is only initially available to that particular restaurant. Upon review, the service provider has the option to make the wine available for all restaurants. Next, the service provider uses the wine list and menu to create suggested pairings 2008. Then, the service provider creates a graphical user interface or "skin" that is unique to the restaurant 2009 using the trademarks, logos, trade dress and graphics provided by the restaurant. Next, the service provider downloads its software onto one or more mobile electronic devices 2010, such as a tablet, smart phone and so forth. Then, the restaurant is provided with the one or more electronic devices, which are automatically set to pull up the graphical user interface, wine list, wine pairings, prices, wine information and so forth that is unique to the restaurant 2011. Next, the restaurant is provided with a username and password to access the restaurant's account 2012. If the restaurant needs to update or change account information, such as an addition of a new wine to its wine list, then the restaurant logs into its account via the Internet and the service provider's server and updates the information 2013. The updated information is then automatically updated on the one or more electronic devices 2014.

Figure 3:
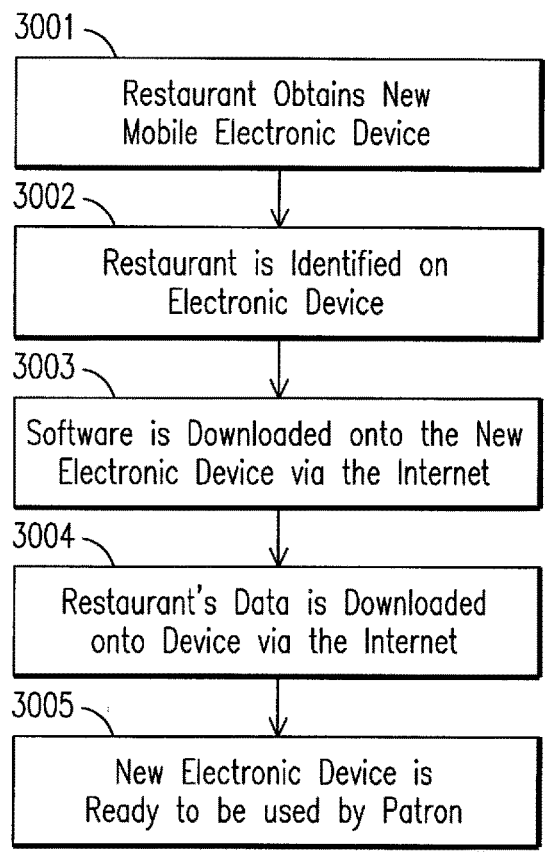
FIG. 3 is a flow chart showing the steps for downloading software onto a new electronic device obtained by a restaurant.

With reference to FIG. 3, a flow chart showing the steps for downloading software onto a new electronic device obtained by a restaurant is illustrated. First, the restaurant obtains a new electronic device 3015. Then, the restaurant is identified on the new device by geolocation, the restaurant logging into an account on the service provider's server using the new electronic device or manually entering the restaurant name and location into the device 3016. Next, the service provider's software is downloaded onto the new electronic device 3017. Then, the restaurant's unique data is downloaded onto the new electronic device 3018. Finally, the new electronic device is ready for use by a patron 3019.

Figure 4:
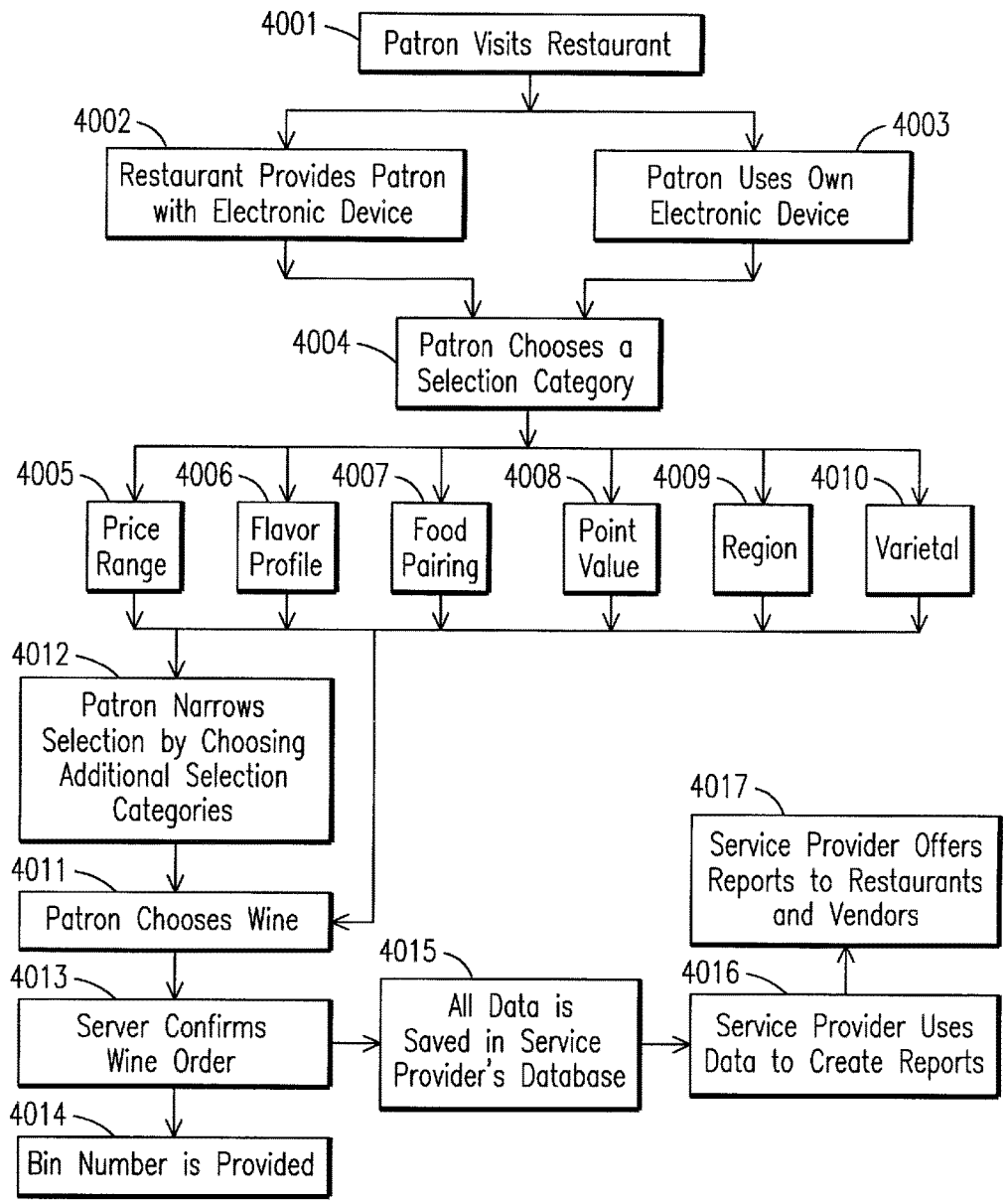
FIG. 4 is a flow chart showing the steps for using an electronic device and system and method of the present invention to order wine.
Figure 5:
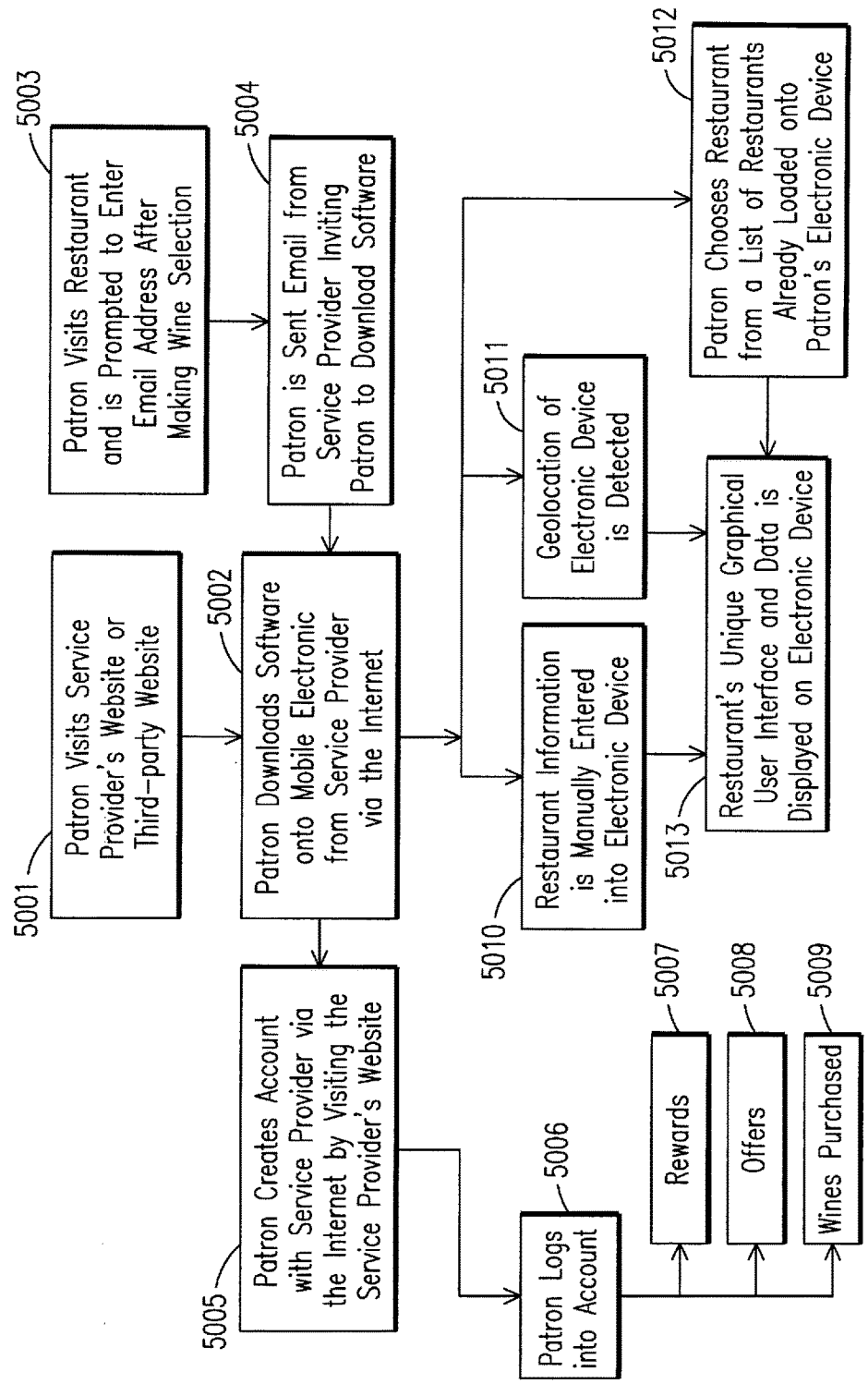
FIG. 5 is a flow chart showing the steps for creating a patron account and downloading software onto a new electronic device.

With reference to FIG. 4, a flow chart showing the steps for using an electronic device and system and method of the present invention to order wine is illustrated. First a patron visits a restaurant that has an account with the service provider 4001. Then, the restaurant provides the patron with an electronic device 4002 or the patron uses his or her own electronic device 4003 having the service provider's software already downloaded onto it, as shown in FIG. 5. Next, the patron chooses a selection category 4004, such as "price range" 4005, "flavor profile" 4006, "food pairing" 4007, "point value" 4008, "region" 4009, "varietals" 4010 and so forth. Then, the patron may make a final selection of wine 4011 or continue to narrow the selection of wines by choosing additional selection categories 4012 before making a final selection of wine 4011. The wine order may be confirmed by the server by entering a pass code or by using a secret touch gesture on a touch screen of the electronic device 4013. A bin number or other identifying stock information is provided to allow the server to easily locate the bottle of wine in the stock room 4014. Every user action made by the patron while using the electronic device, such as buttons pushed, text entry, selection and so forth, is tracked and reported to the service provider's server and saved on the service provider's database 4015, thereby providing the service provider with data describing the decision flow to that particular wine. For example: Did the patron search by country, varietals, price and so forth? How many wines did they review before deciding? Did they search for the wine by name? What food did they pair with the wine? What sort criteria did they use? What badges did the wine have? How long did they spend searching for the wine? What was the price of the wine? The data may then be summarized in reports 4016. For example: How many and/or what percentage of wines are sold on a daily basis? Which wines were sold with beef? Which wines were sold in Italian restaurants? Which wines were chosen by name, region, or varietals? What badges did the wines have? What is the average price of the wine? How many glasses of wine were sold versus bottles? The reports may then be offered vendors as market research 4017.

With reference to FIG. 5, a flow chart showing the steps for creating a patron account and downloading software onto a new electronic device is illustrated. A patron who has heard of the service provider, may visit the service provider's website or a third-party website that offers mobile applications 5001 and download the service provider's software onto the patron's electronic device 5002. Alternatively, a patron may eat at a restaurant and be prompted to enter his or her email address after making a wine selection using an electronic device and the system and method of the present invention 5003. After the patron enters an email address, the patron is sent an email invitation to the service provider's software via the internet 5004. The patron may then download the service provider's software onto the patron's electronic device 5002. The patron may then create an account 5005 and/or use the software with or without an account. If an account is created, the patron may then access the account 5006 to view accumulated rewards 5007, any offers from restaurants or vendors 5008, what wines he or she has purchased in the past 5009 and so forth. The patron may display the unique graphical user interface or "skin" for any restaurant that is has an account with the service provider on the patron's electronic device manually entering a name and location of a restaurant into the electronic device 5010 or if the patron is present at the restaurant the GPS location of the restaurant may be detected by the electronic device 5011 or the patron may choose the restaurant from a list of restaurants already loaded onto the patron's electronic device 5012. The list of restaurants is preferably a list of logos and names that are specific to each restaurant. After the restaurant is identified either manually or by geolocation, the unique graphical interface or "skin" for that restaurant is automatically displayed on the electronic device and the patron can instantly access the wine list, food pairings, etc. for the restaurant 5013. Location based detection via geolocation keeps the patron from having to find and research individual restaurants using an internet browser and/or having to research, download, and launch separate web applications for each individual restaurant. When a unique graphical interface or "skin" is displayed on an electronic device for a particular restaurant, the unique graphical interface appears to be branded specifically for the restaurant as opposed to an individual mobile application that uses a single graphical interface for different restaurants.

Figure 6:
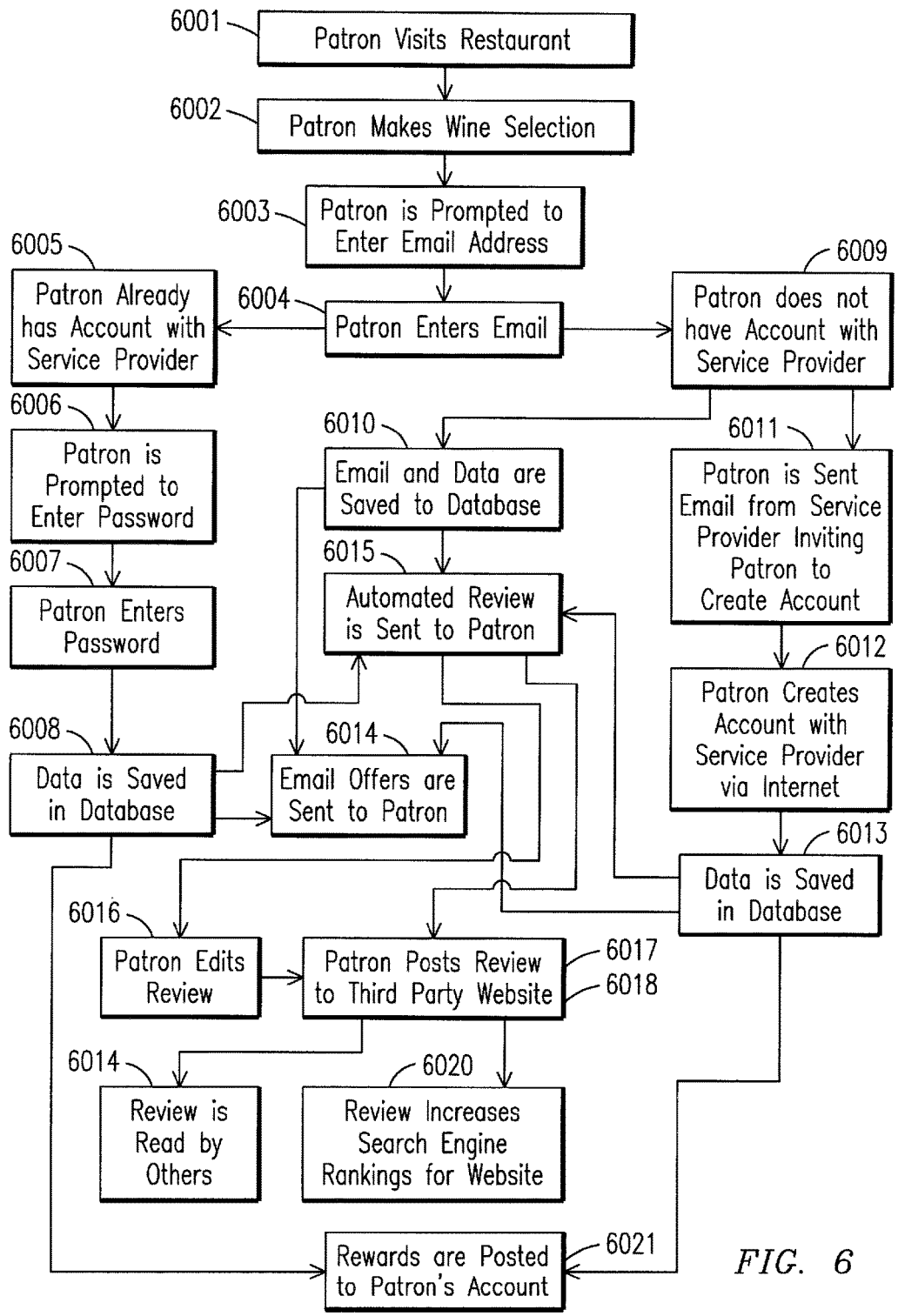
FIG. 6 is a flow chart showing the steps for a patron being prompted to enter contact information after a wine selection has been made using an electronic device and the system and method of the present invention.

With reference to FIG. 6, a flow chart showing the steps for a patron being prompted to enter contact information after a wine selection has been made using an electronic device and the system and method of the present invention is illustrated. First, a patron visits a restaurant that has an account with the service provider 6001. Then, the patron makes a wine selection using the electronic device and system and method of the present invention 6002. Next, the patron is prompted to enter his or her email information into the electronic device 6003. If the patron already has an account with the service provider 6004, then the patron is promoted to enter the password to his or her account 6005. After the password is entered 6006, data about the patron's meal, including the type of wine or wines ordered, is saved in the service provider's database 6007 and will be accessible via the patron's account or as a part of as marketing information for vendor's and restaurants. If the patron does not have an account with the service provider 6009, then the email and data will be saved to in the service provider's database as part of a mailing list for vendors and restaurants 6010. If the patron does not have an account with the service provider 6009, then the patron will also be sent an email inviting the patron to create an account with the service provider 6011. If the patron creates an account with the service provider 6012, then the data about the patron's meal, including the type of wine or wines ordered, is saved in the service provider's database 6013 and will be accessible via the patron's account or as a part of as marketing information for vendor's and restaurants. Saved emails and account information may then be used to send the patron email offers from vendors and restaurants 6014. Saved emails and account information may also be used to send the patron an automated message, such as "Just ate at XYZ restaurant and had a great bottle of XYZ wine and a filet" 6015. The automated message may be edited by the patron 6016 and posted to one or more third party websites, such as social networking websites, review websites and so forth 6017. Alternatively, the patron may post the automated message without editing it 6018. The posted message will then assist the advertisement of the restaurant and wine vendor in two ways. First, others will see the automated message on the one or more third party websites 6019 and second, the posted automated message will increase the restaurant's and the vendor's rankings in Internet search engines 6020. Finally, patrons that have accounts will have any applicable rewards, such as redeemable points, rebates, coupons and so forth, posted to their accounts 6021.

Figure 7:
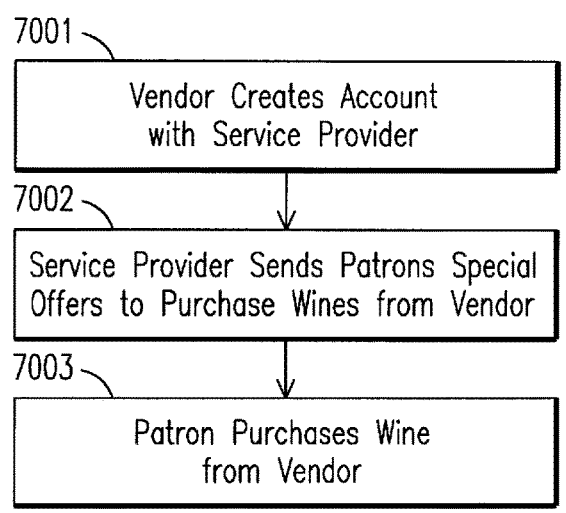
FIG. 7 is a flow chart showing the steps for a vendor using the system and method of the present invention to promote and sell wine directly to patrons.

With reference to FIG. 7, a flow chart showing the steps for a vendor using the system and method of the present invention to promote and sell wine directly to patrons is illustrated. First, a vendor creates an account with the service provider 7001. Then, the vendor may send special offers to patrons who have provided their emails to the service provider or have set up an account with the service provider 7002, as illustrated in FIG. 6. Finally, the patron may choose to purchase the wine from the vendor based on the offer 7003.

Figure 8:
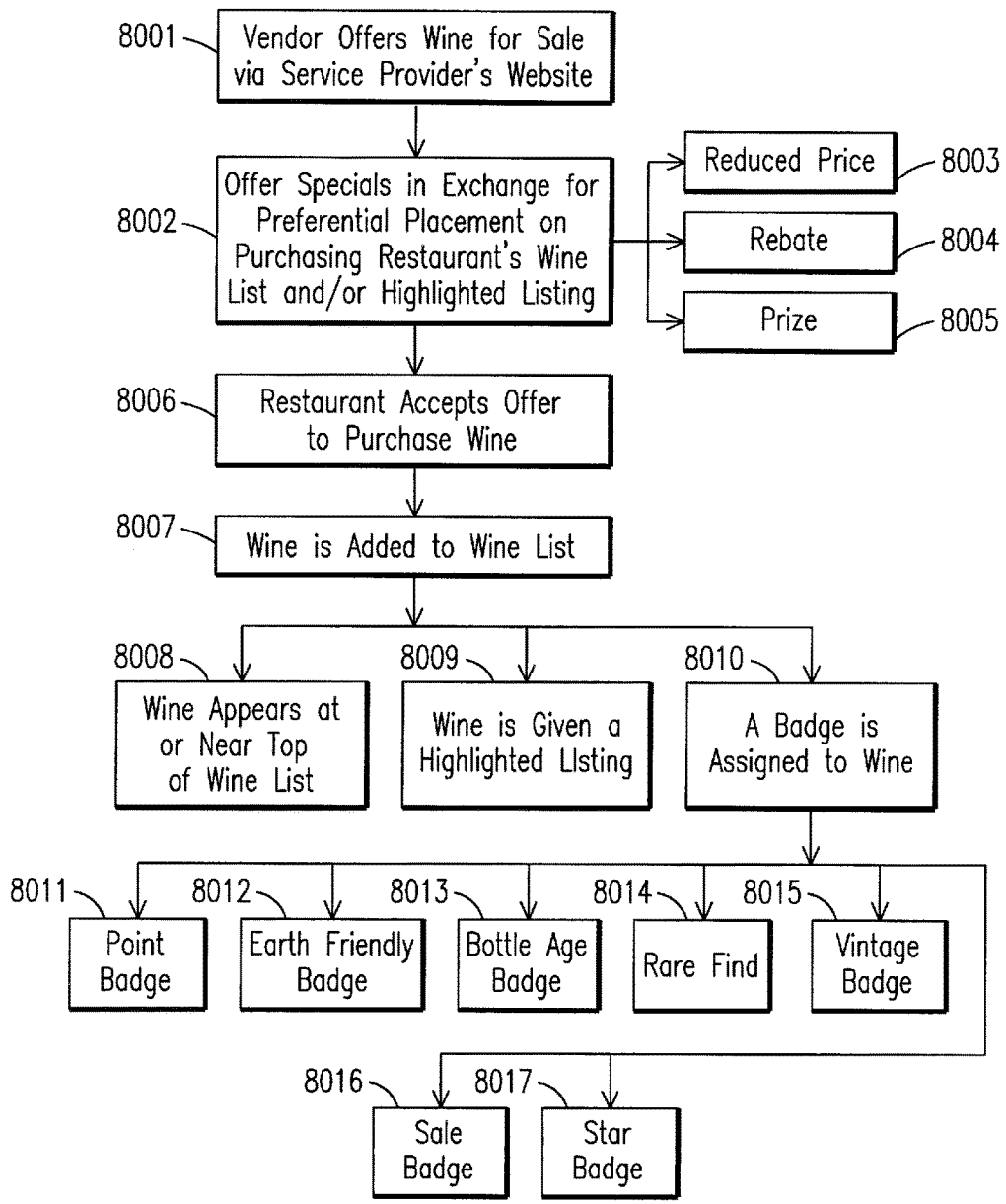
FIG. 8 is a flow chart showing the steps for a vendor using the system and method of the present invention to promote and sell wine to restaurants.

With reference to FIG. 8, a flow chart showing the steps for a vendor using the system and method of the present invention to promote and sell wine to restaurants is illustrated. First, a vendor creates an account with the service provider 8001. Then, the vendor offers wine for sale through the service provider's website to restaurants in an auction type sale 8002. The offer may include a reduced price 8003, a rebate 8004 and/or a prize 8005, such as electronic devices, restaurant equipment and so forth. Next, a restaurant purchases the wine from the vendor based on the offer 8006. Then, the wine is added to the restaurants wine list by the service provider 8007. Based on the offer, the wine may be placed at or near the top of the wine list when a patron's search produces that particular type of wine 8008, the wine may be given a highlighted listing 8009 and or the wine may be assigned a badge 8010. The badges may include a point badge 8011, an earth friendly badge 8012, a bottle age badge 8013, a rare find badge 8014, a vintage badge 8015, a sale badge 8016 or a star badge 8017.

Figure 9:
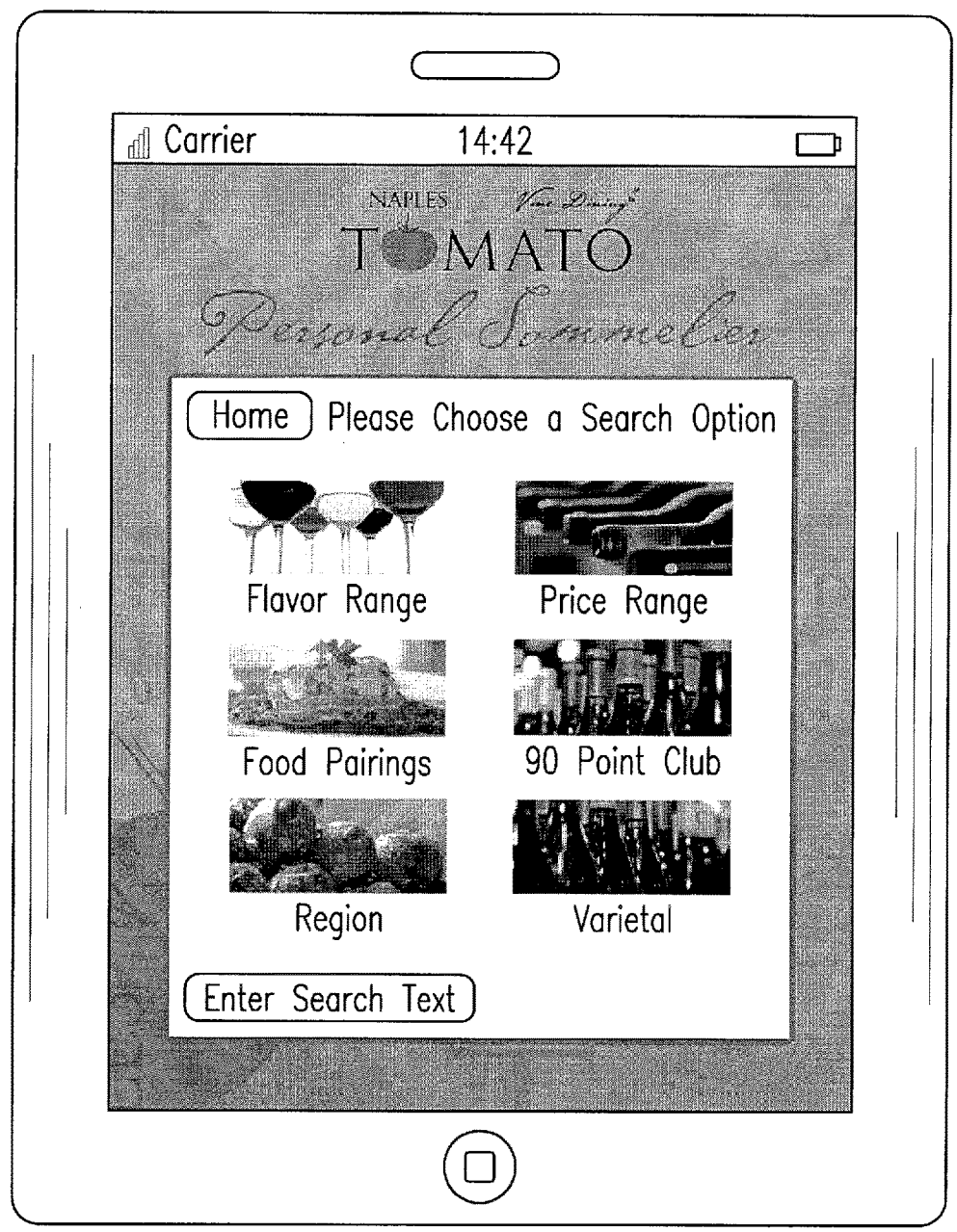
FIG. 9 is a front view of an electronic device displaying a main screen displaying options for selecting a wine using selection categories.

FIG. 9 is a front view of an electronic device displaying a main screen displaying options for selecting a wine using selection categories, such as "flavor range," "price range," "food pairings," "90 point club," "region" "varietals" and so forth. A patron also has an option to enter search terms if he or she is looking for a specific wine, as described in more detail in FIG. 3.

Figure 10:
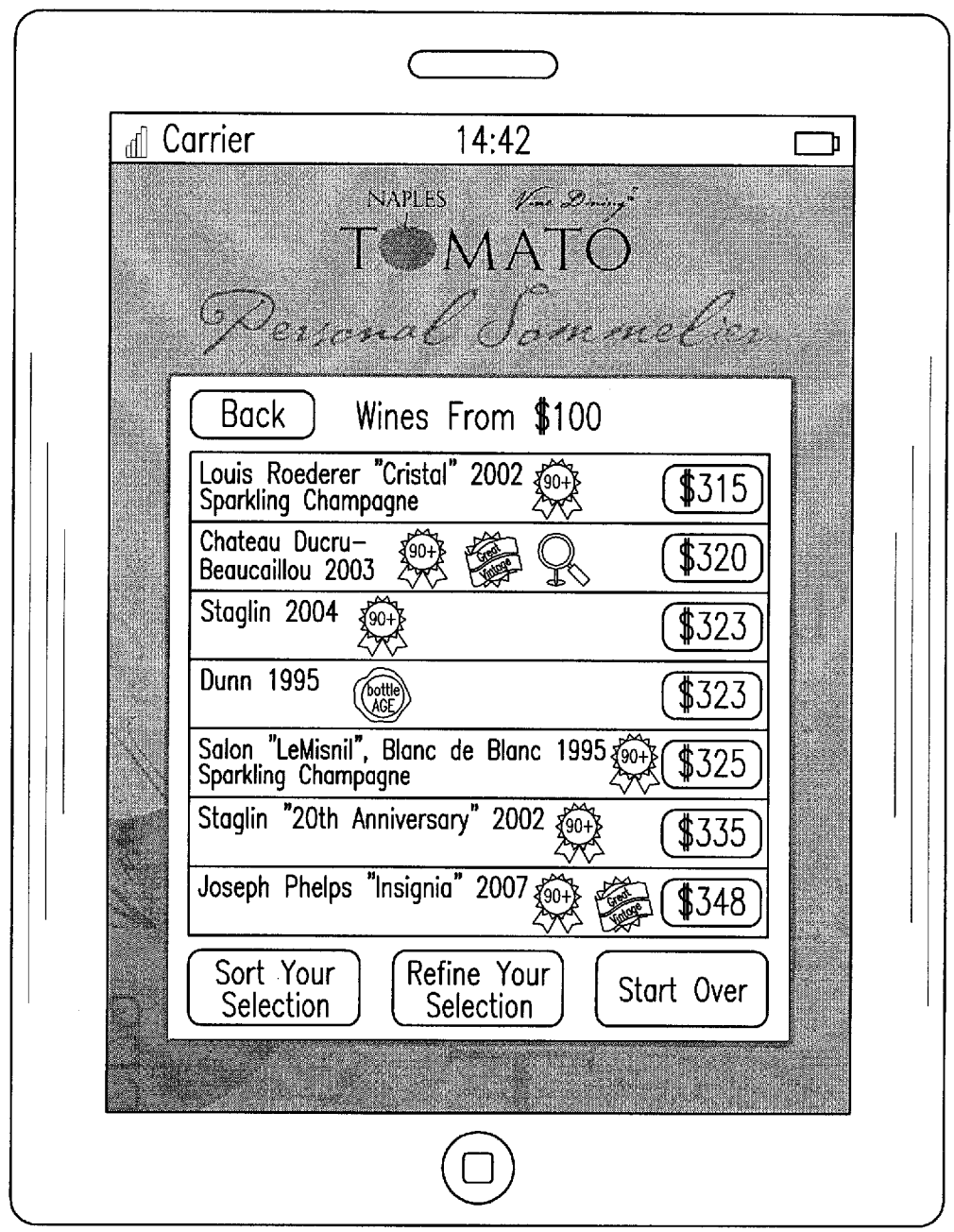
FIG. 10 is a front view of an electronic device displaying a screen displaying an electronic wine list of the present invention in which the wines have been narrowed by price.

FIG. 10 is a front view of an electronic device displaying a screen displaying an electronic wine list of the present invention in which the wines have been narrowed by price. Wines having badges assigned thereto have been sorted to the top of the list, as described in more detail in FIG. 8.

Figure 11:
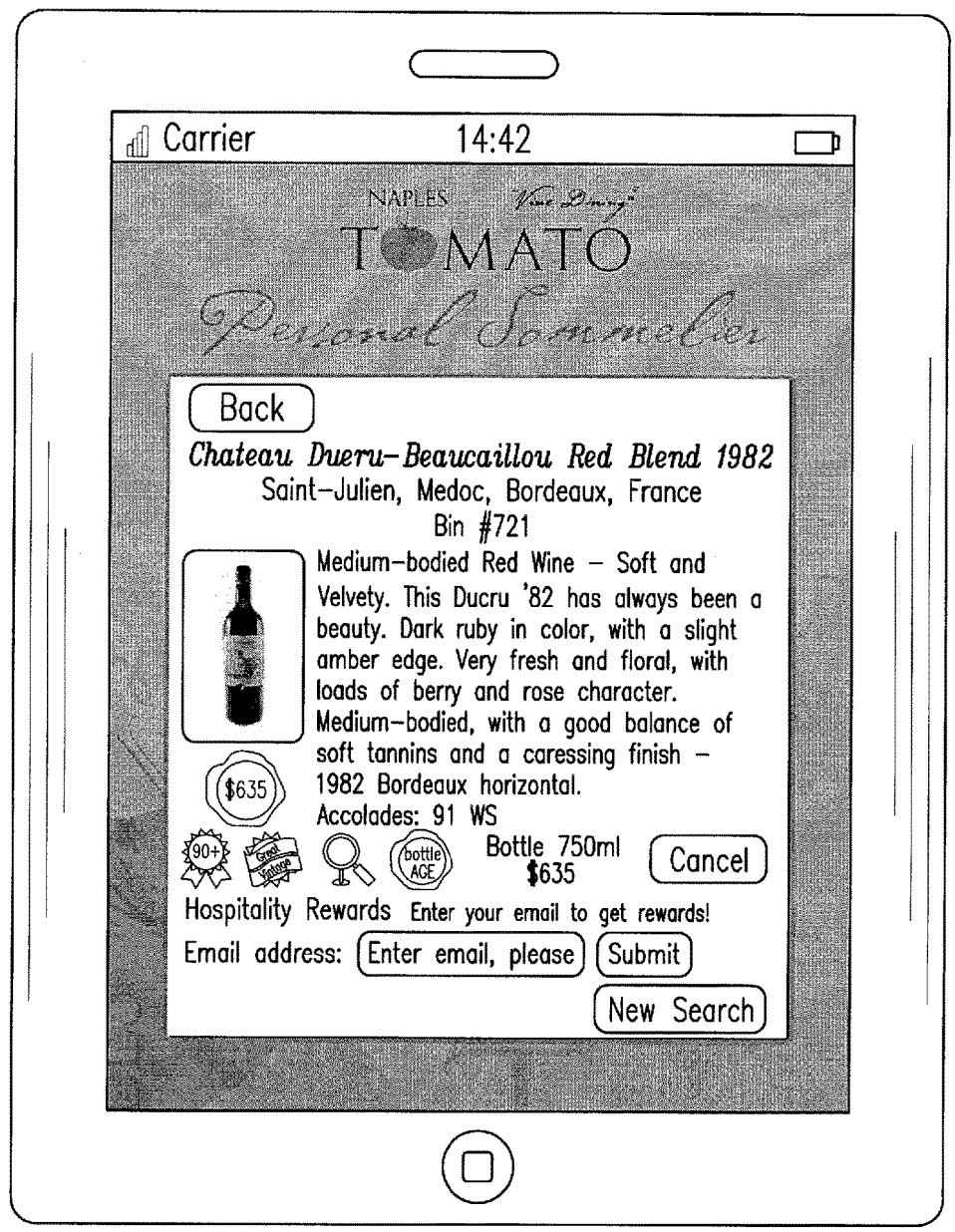
FIG. 11 is a front view of an electronic device displaying a screen after a patron has selected a wine.

FIG. 11 is a front view of an electronic device displaying a screen after a patron has selected a wine. The patron is prompted to enter his or her email address, as described in more detail in FIG. 6.

Figure 12:
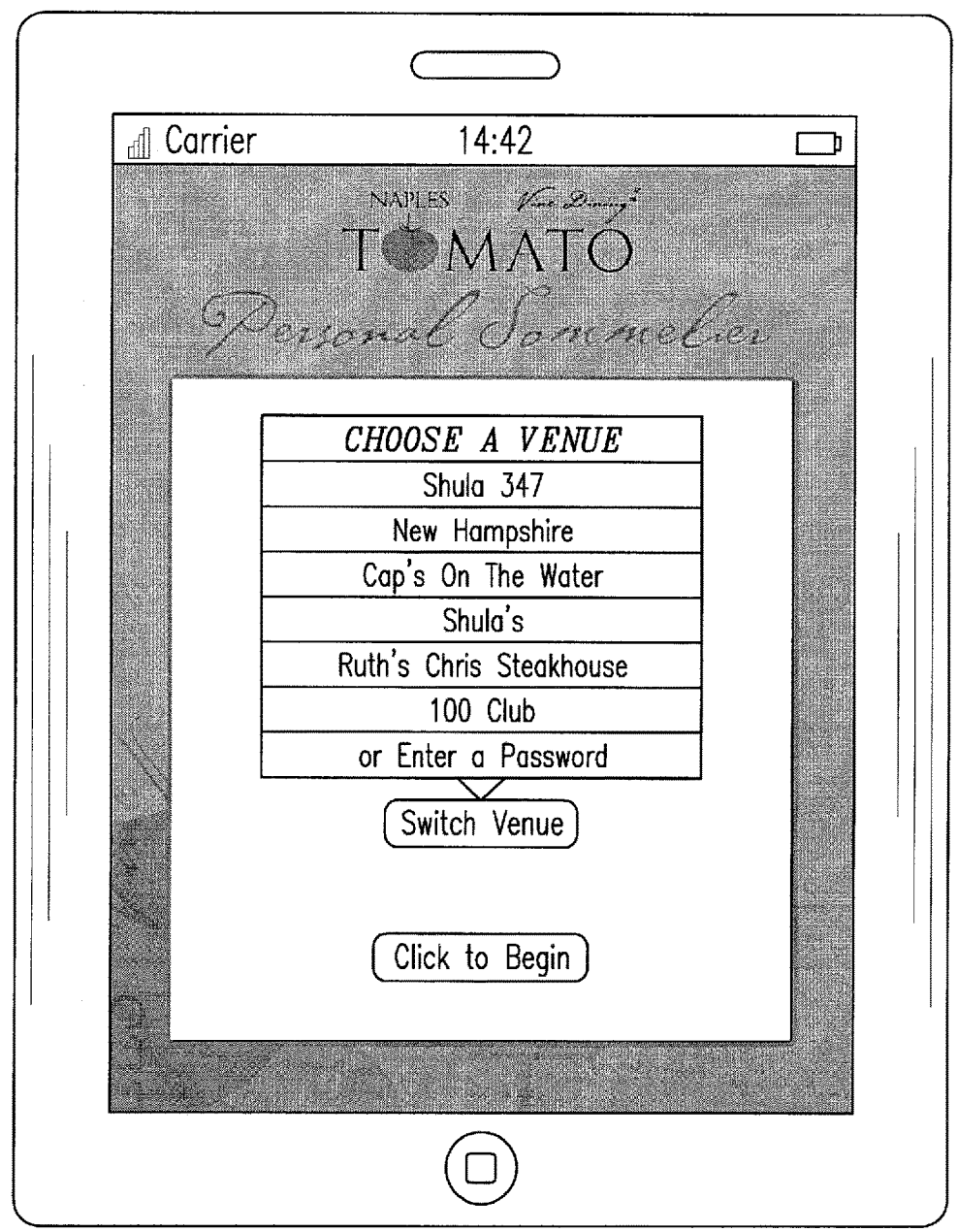
FIG. 12 is a front view of an electronic device displaying a screen having a choose venue option.

Finally, FIG. 12 is a front view of an electronic device displaying a screen having a choose venue option, as described in more detail in FIG. 5.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, We claim:

1. A computer-based system for creating and transmitting an interactive wine list within a restaurant and among a plurality of restaurants to provide wine-food pairings and promote the sale of wine within said restaurant and among said plurality of restaurants, said system comprising:

a computer-based network for coupling said plurality of restaurants to one another, to a computer-based server, and to a database, said server and database being controlled and operated by a service provider, one of said service provider or—said restaurant transmitting over said computer-based network and inputting a set of wine description data into said database using said server, said set of wine description data including at least one of a wine name, a vintage, an appellation, a country, a varietal and a price, said wine description data transmitted by said server to said plurality of restaurants over said computer-based network;

a computer-based electronic device accessed and being controlled by said restaurant, said restaurant electronic device coupled to said server and said database via said computer-based network, said restaurant using said restaurant electronic device to create a restaurant account on said database using said server, said restaurant inputting a set of restaurant data into said restaurant electronic device, said set of restaurant data including a restaurant wine list containing available wines, a restaurant wine menu containing food items available at said restaurant, and graphical restaurant presentation data, said restaurant electronic device being located at said restaurant, said graphical restaurant presentation information being determined by said location of said restaurant, said restaurant electronic device transmitting said set of restaurant data to said server and storing said set of restaurant data in said restaurant account, said server using said wine description data and said restaurant data to create said interactive wine list, said interactive wine list including at least one wine-food pairing and said graphical restaurant presentation data, said interactive wine list being transmitted by said server over said computer-based network to said plurality of restaurants, reviewing by said service provider said interactive wine list from a particular restaurant of said plurality of restaurants and providing an option to make said wines from said particular restaurant available to said plurality of restaurants;

a computer-based electronic device accessed by a patron of said restaurant, said patron electronic device coupled to said server and said database via said computer-based network, said patron electronic device determining a location of said patron electronic device with a GPS detection unit within said patron electronic device, said server transmitting said interactive wine list over said computer-based network to said patron electronic device when said location determined by said patron electronic device is one of said plurality of restaurants, said patron electronic device displaying said interactive wine list according to said graphical restaurant presentation information so as to create an interactive menu, said graphical restaurant presentation data being determined by said detected location of said patron electronic device, said patron selecting an available food item from said interactive menu, said patron electronic device displaying said wine-food pairing data within said interactive menu based on said selected food item, said patron selecting a bottle of wine based on said wine food pairing.

2. The system of claim 1 wherein said interactive menu includes a prompt field, said prompt field requesting said patron to enter an email address, said patron entering a patron email address into said prompt field using said patron electronic device, said patron electronic device transmitting said patron email address and said wine description data associated with said selected bottle of wine to said server, said server storing said email address in said database, said server transmitting an automated message to said patron electronic device, said automated message including a prompt for said patron to provide a review of said restaurant, said patron providing said review, said patron electronic device transmitting said automated message and said patron review to a website, said patron review being posted on said website.

3. The system of claim 2 wherein said email with said automated message contains a coupon that said patron can use when returning to said restaurant.

4. The system of claim 3 wherein said coupon includes a coupon for said selected bottle of wine.

5. The system of claim 2 wherein said email with said automated message contains an offer for said patron to create a patron account on said database using said server.

6. The system of claim 5 wherein said patron accepts said offer, said patron inputting patron data into said patron electronic device, said patron electronic device transmitting said patron data to said server, said server creating said patron account on said database, said server saving said selected bottle of wine within said patron account on said database.

7. The system of claim 6 wherein said patron accesses said patron account using said patron electronic device, said server transmitting a bottle of wine previously selected by said patron and stored within said patron account to said patron electronic device.

8. The system of claim 2 further comprising:

a computer-based electronic device accessed by a wine vendor, said vendor electronic device coupled to said server via said computer-based network, said wine vendor transmitting a vendor wine list to said server, said server storing said vendor wine list on said database, said service provider creating an auction for at least one of said wines on said vendor wine list to said restaurants, said auction including a vendor offer, said restaurants purchasing said at least one of said wines on said vendor wine based on said offer, said service provider adding said purchased vendor wine to said interactive wine list of said purchasing restaurant.

9. The system of claim 8 wherein said offer includes one of a reduced price, a rebate, or a prize.

10. The system of claim 1 wherein said wines on said interactive wine list are assigned a badge, said badge being assigned by one of a wine vendor, said restaurant, former patrons of said restaurant, or said service provider, said badge being used only on said interactive wine list of said restaurant.

11. The system of claim 10 wherein said badge is one of: a points badge, an earth-friendly badge, a bottle age badge, a rare find badge, a vintage badge, a sale badge, or a star badge.

12. The system of claim 1 wherein said wine lists and associated wine description data are shared among said plurality of restaurants.

13. The system of claim 1 wherein said price is provided by either said restaurant or a wine vendor.

14. The system of claim 1 wherein said restaurant graphical restaurant presentation information includes at least one of a trademark, a logo, and graphics.

15. The system of claim 8 wherein said vendor is one of a winery or a wine store.

* * * * *